Dec. 23, 1947.　　　　R. M. MERO　　　　2,433,057
CONTAINER SEALING MACHINE
Filed July 1, 1942　　　12 Sheets-Sheet 1

Inventor
Ralph M. Mero
Mason, Porter & Diller
Attorneys

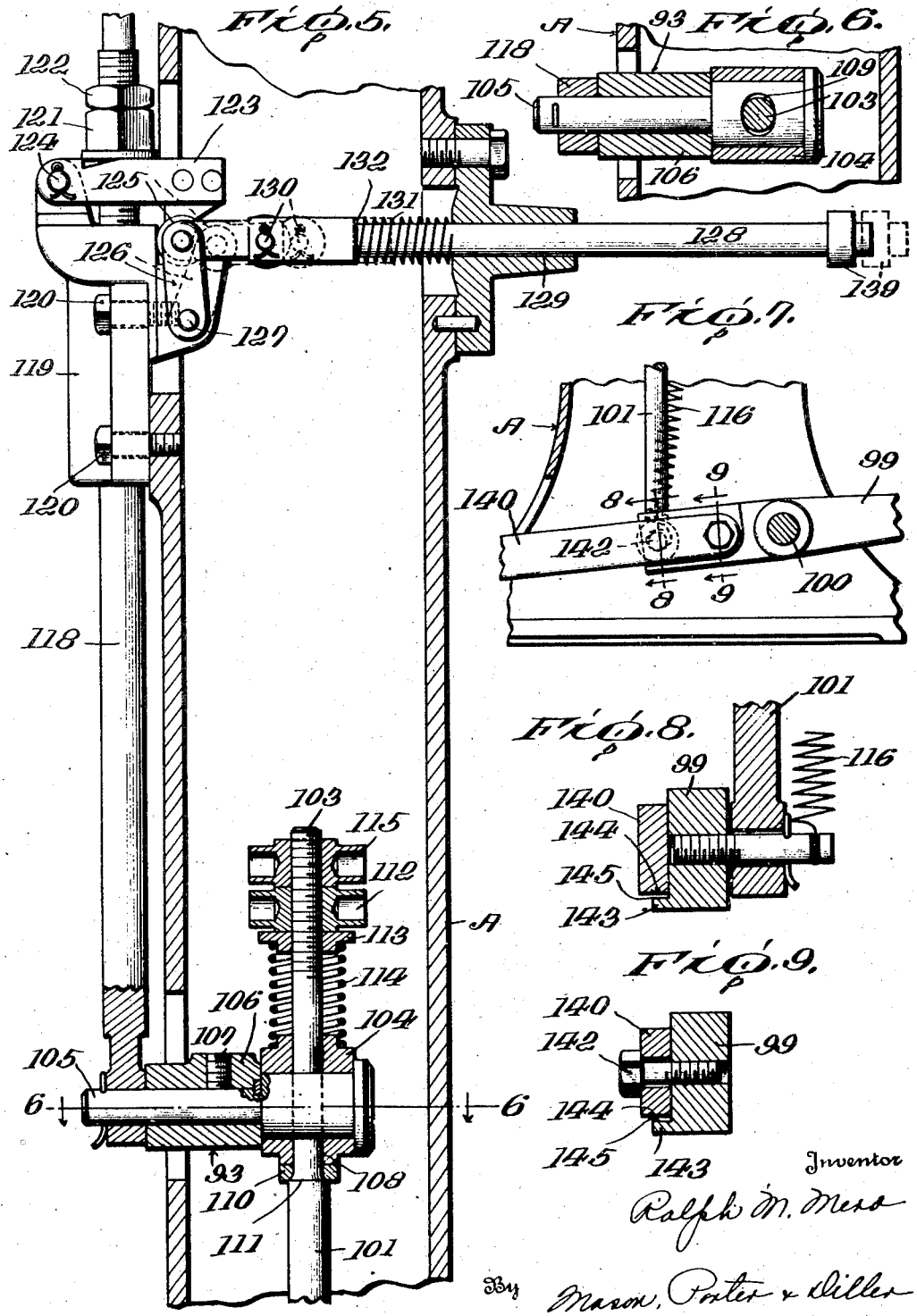

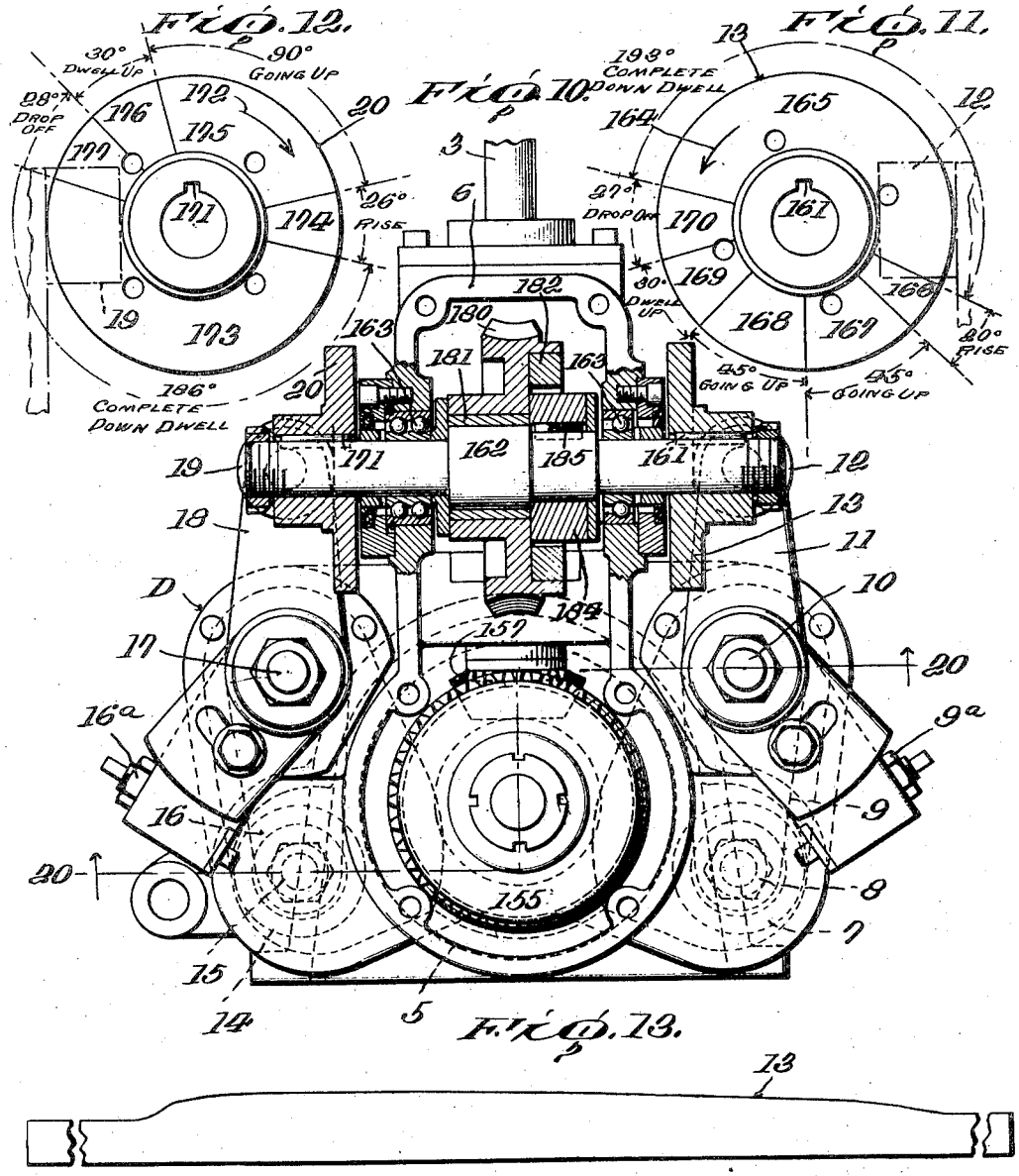

Dec. 23, 1947.  R. M. MERO  2,433,057
CONTAINER SEALING MACHINE
Filed July 1, 1942    12 Sheets-Sheet 7
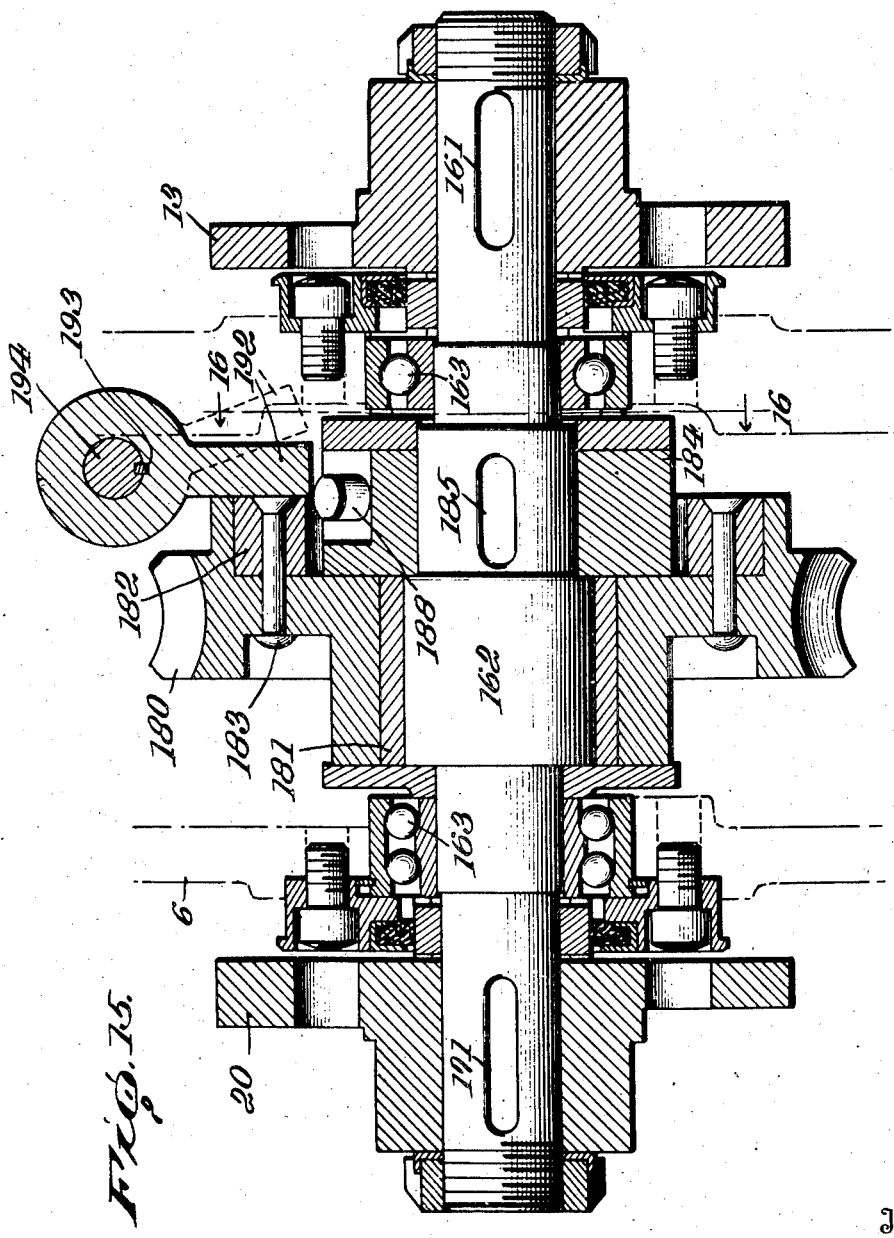

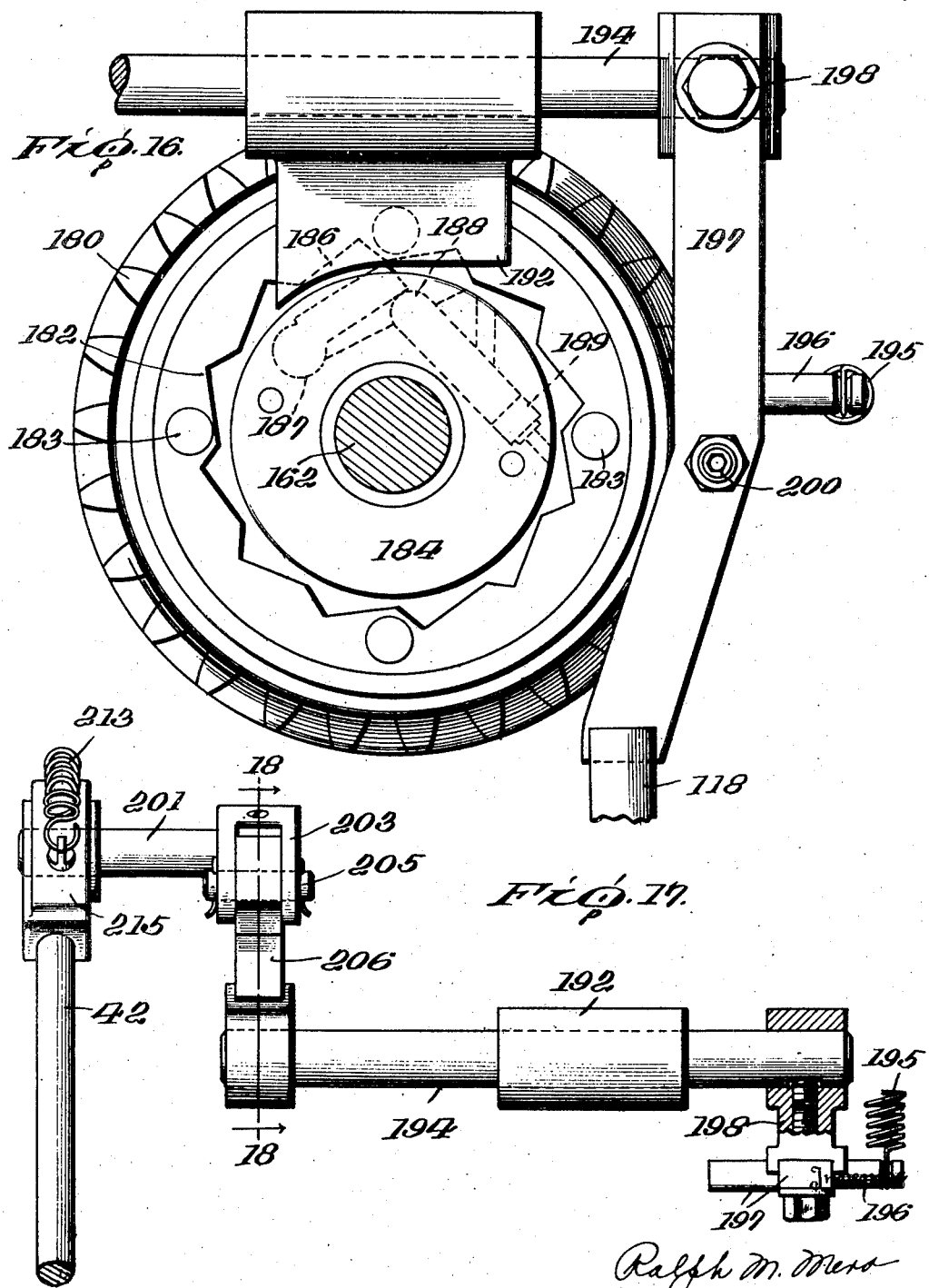

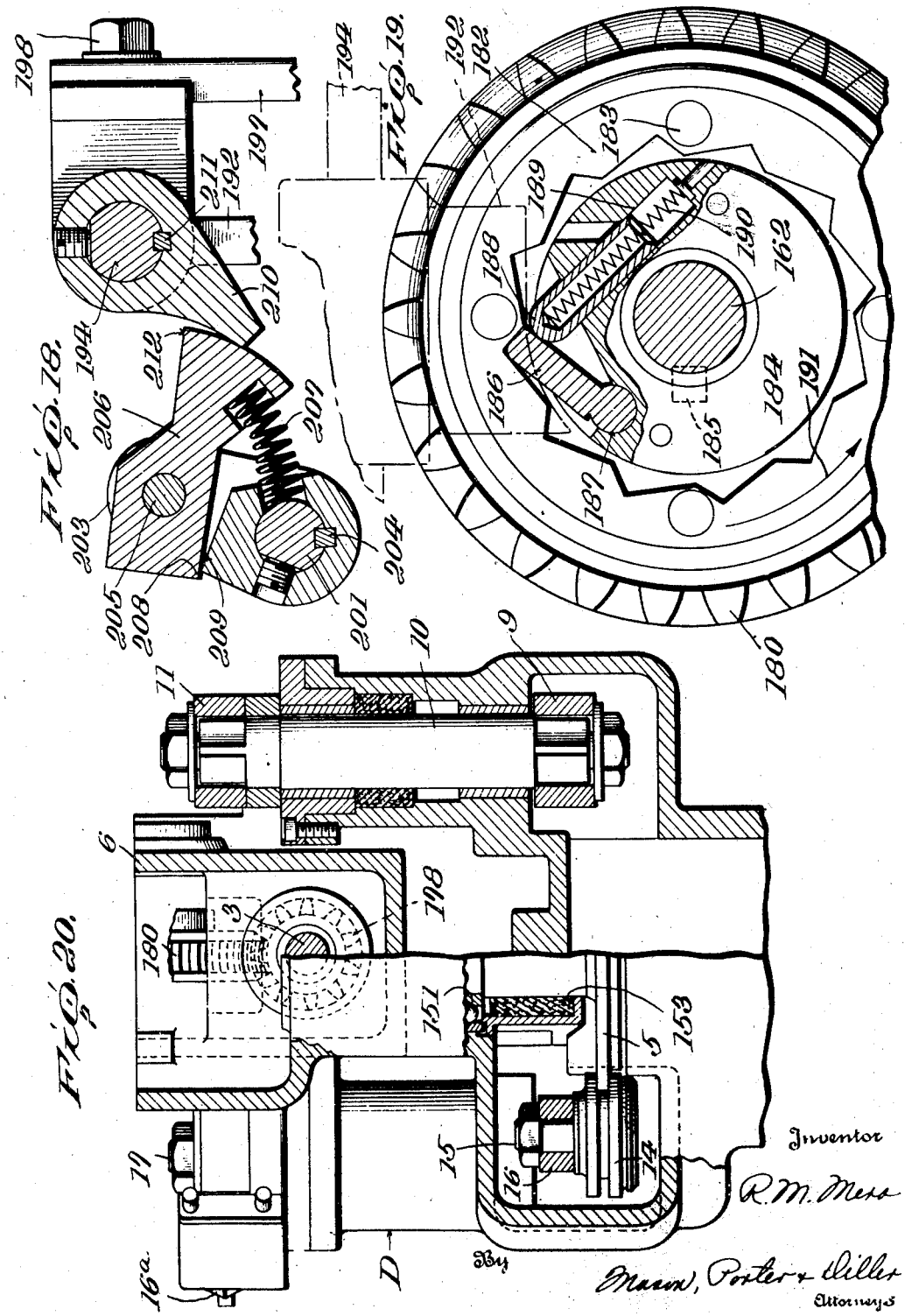

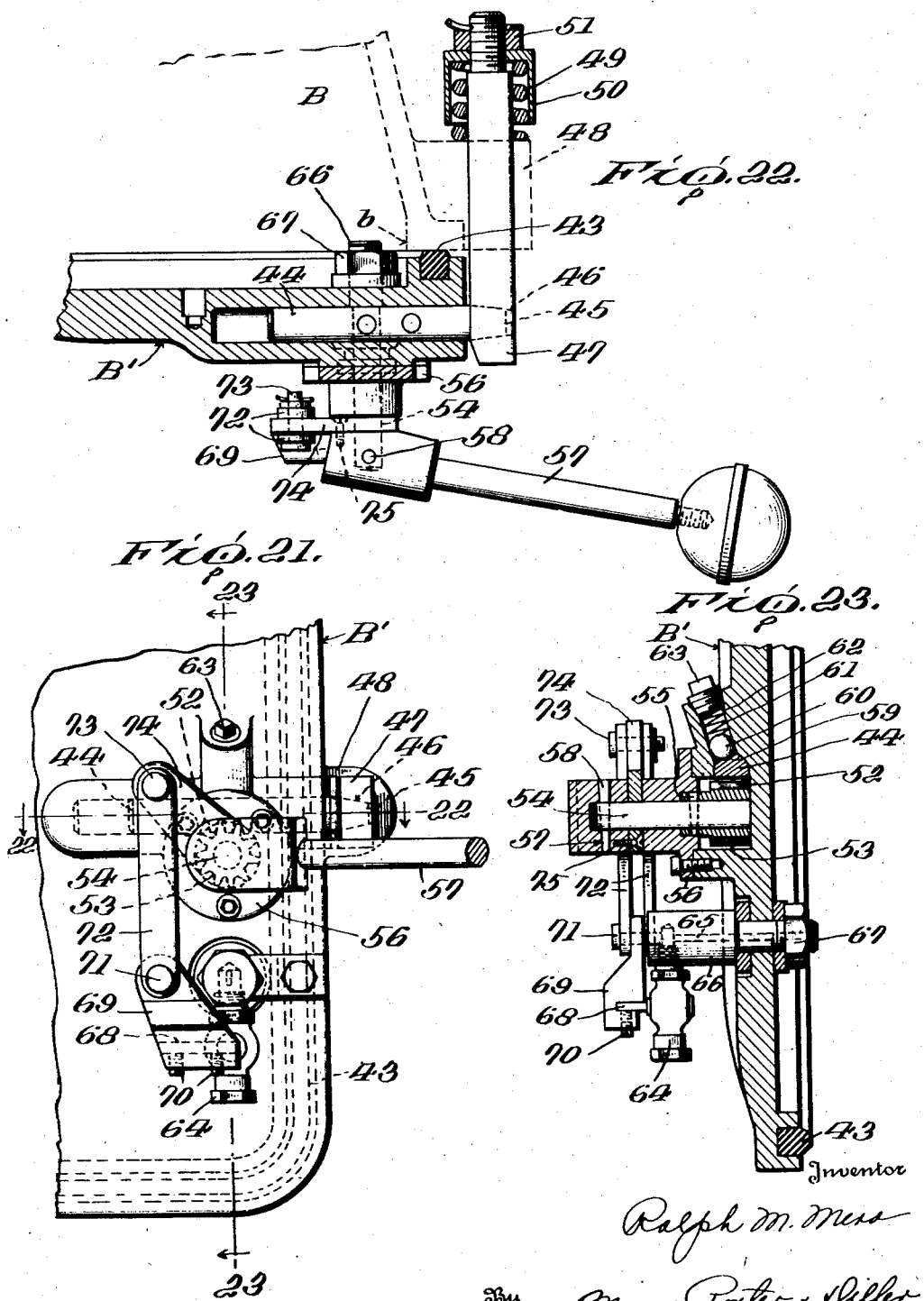

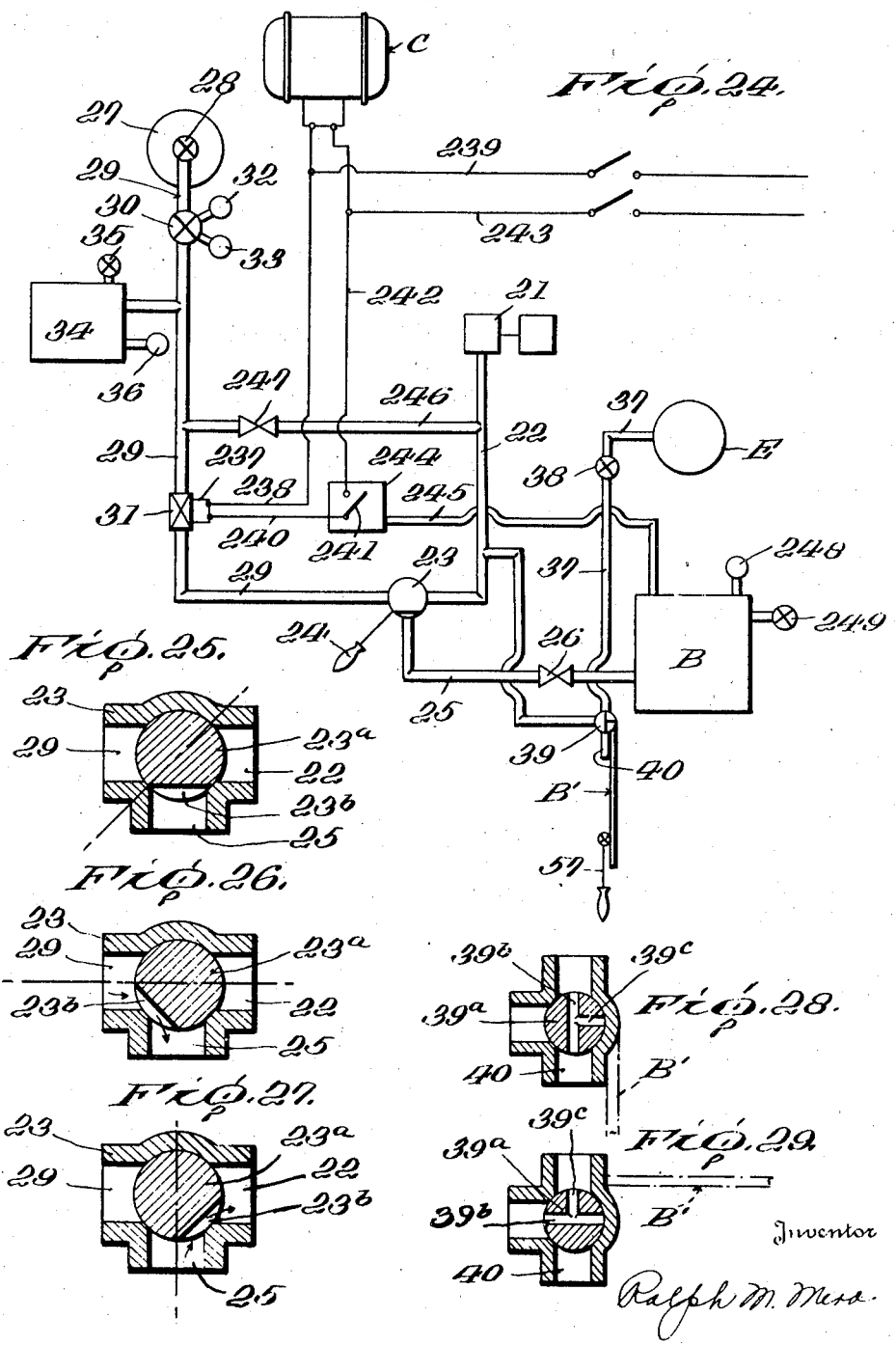

Dec. 23, 1947.   R. M. MERO   2,433,057
CONTAINER SEALING MACHINE
Filed July 1, 1942   12 Sheets-Sheet 12
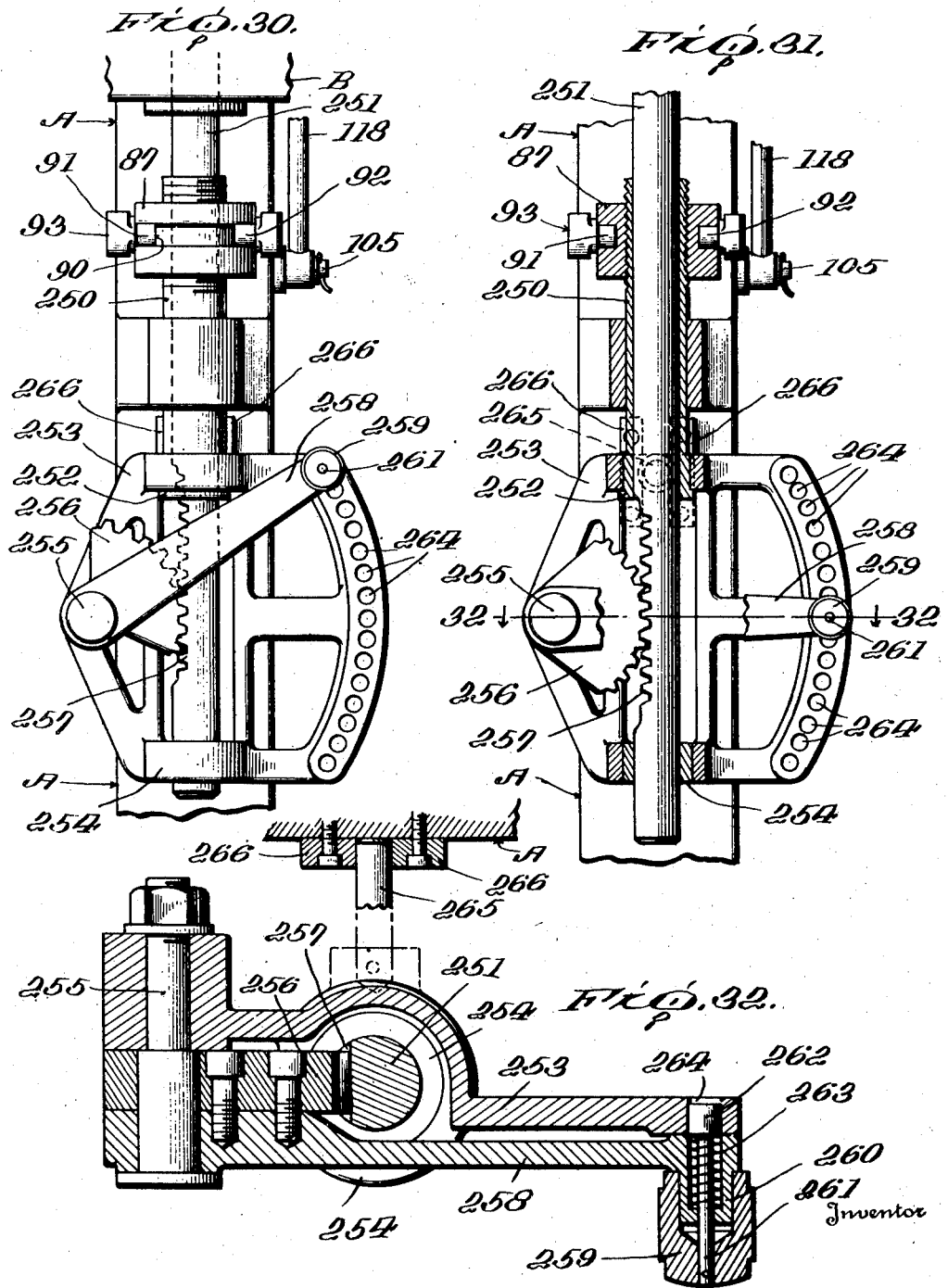

Patented Dec. 23, 1947

2,433,057

UNITED STATES PATENT OFFICE 2,433,057

CONTAINER SEALING MACHINE

Ralph M. Mero, Chicago, Ill., assignor to Continental Can Company, Inc., New York, N. Y., a corporation of New York Application July 1, 1942, Serial No. 449,301

21 Claims. (Cl. 226—68)

This invention relates to container sealing machines and more particularly to mechanism for effecting and controlling the operation of container sealing machines of the general class of the machine disclosed in the copending application of George F. Jackson, Serial Number 406,529, filed August 12, 1941, now Patent 2,327,430.

The machine disclosed in the copending application embodies a seaming chamber, a container rotating chuck in the chamber, seaming means manually engageable with a container rotated by the chuck, a container supporting pad movable toward and from the chuck, means for drawing a vacuum in the chamber, and means for gassing the chamber after the vacuum is drawn and prior to the seaming operation.

A general object of the invention is to provide a machine of the character stated, with operating mechanisms and interlocking controls for insuring that the proper steps for conditioning the container and its contents for sealing will be performed before the sealing operation is started.

Another object of the invention is to provide an improved and simple fluid pressure operated mechanism for moving a container and container end into position for being seamed.

Another object of the invention is to provide power operated mechanism for first moving a container and a container end towards each other within a sealing chamber until separated by a small predetermined space, and for thereafter automatically continuing the relative movement in response to establishing of a predetermined gaseous condition in the sealing chamber.

Another object of the invention is to provide power operated mechanism for moving a container in steps to the sealing position including a force-transmitting spring adapted to be loaded when the container is arrested in spaced relation to the container end, and adapted to unload by moving the container further and into sealing position.

Another object of the invention is to provide a machine of the character stated including mechanism for effecting movement of a container into sealing position in response to establishing of a predetermined gaseous condition in a chamber in which the sealing operation is to be performed.

Another object of the invention is to provide a machine of the character stated including a sealing chamber provided with a door, and power operated mechanism responsive to closing of the sealing chamber door for moving a container and container end relatively toward each other.

Another object of the invention is to provide a machine of the character stated including a sealing chamber provided with a door, and power operated mechanism responsive to opening of the sealing chamber door for moving a sealed container away from seaming mechanism housed in the chamber.

Another object of the invention is to provide a machine of the kind referred to including seaming mechanism and a one-revolution clutch controlled by trip mechanism for driving the seaming mechanism for a predetermined period in response to a single stroke of a manually operable control member.

Another object of the invention is to provide a machine of the kind referred to including seaming mechanism and interlocking control means for preventing operation thereof until a container and container end have been placed relatively in position ready to be seamed.

Another object of the invention is to provide a machine of the kind referred to including a sealing chamber adapted to be closed by a door and means for establishing communication of the chamber with the atmosphere in response to unlatching of the door to thereby equalize pressure on opposite sides of the door and facilitate its being opened.

Another object of the invention is to provide a machine of the character stated including a sealing chamber adapted to be closed by a door equipped with a latch, and an improved keeper cooperable with the latch and yieldable to permit relieving of abnormal pressure in the chamber.

Another object of the invention is to provide a machine of the character stated including new and improved means for adjusting the parts for receiving and sealing cans of different sizes.

Another object of the invention is to provide a machine of the character stated including new and improved means for vacuumizing and gassing a sealing chamber.

A further object of the invention is to provide a machine of the kind referred to including new and improved container ejecting means constructed to minimize the likelihood of becoming stuck or jammed in projected position.

A further object of the invention is to provide a machine of the character stated having optionally operable power means and manually actuatable means for moving a container and container end relatively into sealing position.

Other objects will become apparent from a reading of the following detail description, the appended claims, and the accompanying drawings.

In the drawings:

Figure 5 is a fragmentary vertical section on the line 5—5 of Figure 2 and drawn on an enlarged scale;

Figure 6 is a horizontal section on the line 6—6 of Figure 5;

Figure 7 is a fragmentary view showing a part of a machine frame in section and showing an operating lever and manually operable treadle in elevation;

Figure 8 is a section on the line 8—8 of Figure 7;

Figure 9 is a section on the line 9—9 of Figure 7;

Figure 10 is a section on the line 10—10 of Figure 4;

Figure 11 is an elevation or face view of a first operation seaming roller cam;

Figure 12 is an elevation or face view of a second operation seaming roller cam;

Figure 13 is a diagrammatic development of the first operation cam shown in Figure 11;

Figure 14 is a diagrammatic development of the second operation cam shown in Figure 12;

Figure 15 is an enlarged vertical section through a one revolution clutch mechanism mounted on a shaft which carries the cams shown in Figures 11 and 12;

Figure 16 is a vertical section on the line 16—16 of Figure 15 showing a clutch trip finger in clutch disengaging position;

Figure 17 is a top view partly in plan and partly in section, showing a clutching tripping mechanism;

Figure 18 is a section on the line 18—18 of Figure 17;

Figure 19 is a view similar to Figure 16 but showing the clutch trip finger in released position and showing the clutch engaged;

Figure 20 is a vertical section on the irregular lines 20—20 of Figure 10;

Figure 21 is a fragmentary elevation of a portion of a sealing chamber door, and showing a door latch and relief valve mechanism operable in connection therewith;

Figure 22 is a horizontal section on the line 22—22 of Figure 21;

Figure 23 is a vertical section on the line 23—23 of Figure 21;

Figure 24 is a diagram showing electrical connections and valved conduits for controlling the operation of a fluid pressure motor and for drawing a vacuum in and gassing a sealing chamber;

Figure 25 is a sectional view showing the position of a control valve rotor for closing communication between the sealing chamber and both a source of vacuum and a source of gas supply;

Figure 26 is a view similar to Figure 25 but showing the control valve rotor positioned to provide communication between the gas supply and the sealing chamber;

Figure 27 is a view similar to Figure 25 but showing the valve rotor positioned to provide communication between a vacuum pump and a sealing chamber;

Figure 28 is a sectional view of another valve showing its rotor positioned to connect a fluid pressure motor cylinder with the atmosphere;

Figure 29 is a view similar to Figure 28, but showing the valve rotor positioned to provide communication between the fluid pressure motor cylinder and the vacuum pump;

Figure 30 is a fragmentary front elevation of a container lifting rod assembly and mechanism applied thereto for adjusting the assembly to adapt it for operation in sealing cans of different sizes;

Figure 31 is a view similar to Figure 30 but with some parts shown in section and with the parts shown in positions for adjustment different from the positions shown in Figure 30;

Figure 32 is a section on the line 32—32 of Figure 31.

Figure 1:
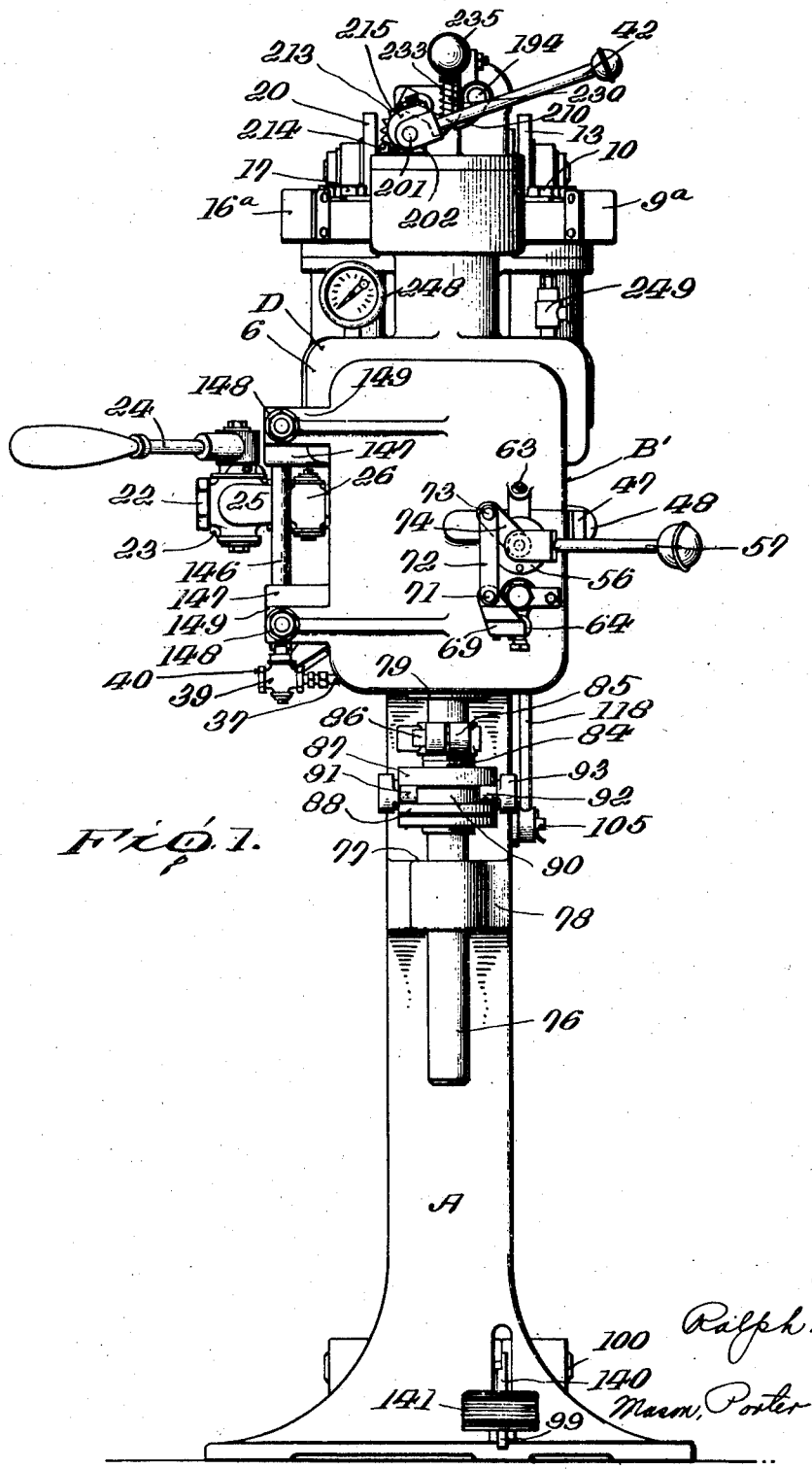
Figure 1 is a front elevation of a sealing machine embodying the invention.

The illustrated embodiment of the invention includes a frame A on which is mounted a sealing chamber B formed with an access opening b adapted to be closed by a door B'. A bracket 1 carried on the frame A supports a motor C which is connected through a pulley and belt drive 2 to an input shaft 3 of a seaming head unit generally designated D.

A pad element 4 is mounted for vertical movement in the sealing chamber B for holding a can indicated at X in position to have applied thereto a can end indicated at Y held on a magnetic chuck element 5 also mounted in the sealing chamber B. In operation, the can X is placed on the pad 4 while the latter is in its lower position, and the closure B' is then closed. The pad 4 and can X may then be raised partially but are not moved up far enough to bring the can into engagement with the can end Y until a desired predetermined gaseous condition has been established in the sealing chamber B. After the proper condition has been established within the chamber B, the pad 4 is raised further and the can and can end are seamed.

The seaming is accomplished by mechanism housed within the casing 6 of the head unit D and driven by the shaft 3. The seaming mechanism includes a first operation roll 7 journalled as at 8 on an arm 9 pivoted as at 10 on the frame casing 6. Fast with the arm 9 is an arm 11 carrying a cam follower roller 12 engaging a first operation cam 13. A second operation seaming roll 14 is journalled as at 15 on an arm 16 pivoted as at 17 on the unit casing 6. An arm 18 fast with the arm 16 is provided with a follower roller 19 engaging a second operation cam 20. The arms 9 and 16 may be adjustable as at 9ᵃ and 16ᵃ respectively, in the manner disclosed in the patent to Kronquest 1,752,912 granted April 1, 1930.

As indicated diagrammatically in Figure 24, the sealing chamber B may be evacuated by a vacuum pump 21 connected through a conduit 22 to a control valve 23, which in turn is connected to the chamber B through the medium of a conduit 25 interposed in which is a shut-off valve 26. For gassing the chamber there is provided a gas supply container 27 equipped with cylinder valve 28 which controls communication of the container 27 with a conduit 29. A gas pressure control valve 30 interposed in the conduit 29 provides for reducing the gas pressure. After flowing through the valve 30, the gas continues through the conduit 29 and through a solenoid operated valve 31 and thence to the control valve 23. Pressure gauges 32 and 33 are provided for indicating the pressure on the opposite sides of the reducing valve 30 respectively. Preferably a ballast tank 34 is connected to the conduit 29 and is provided with a safety valve 35 and vacuum pressure gauge 36.

As shown in Figures 25, 26 and 27 the control valve 23 includes a handle 24, a rotatable element 23a formed with a cut-out 23b, the arrangement being such that the conduit 25 leading to the chamber B may be cut off entirely as shown in Figure 25, or it may be placed in communication with the gas conduit 29 as shown in Figure 26, or it may be placed in communication with the vacuum conduit 22 as shown in Figure 27.

Power for lifting the pad 4 may be supplied by a fluid pressure motor generally designated E. As shown in Figure 24, a conduit 37 leads from the motor E through a speed control valve 38 to a pad lifting control valve 39 which is operated by the opening and closing of the door B'. As shown in Figures 28 and 29, the valve 39 includes a rotatable element 39a formed with a diametric passage 39b and a radial passage 39c at right angles to and communicating with the passage 39b. The arrangement is such that the valve may be positioned as shown in Figure 28 so as to provide communication between the conduit 37 and an opening 40 leading to the atmosphere, this being the position of the valve when the door B' is open. When the door is closed, the valve element 39a will be moved to the position shown in Figure 29, wherein the passages 39b and 39c provide communication between the conduit 37 and a conduit 41 in constant communication with the conduit 22 and consequently with the vacuum pump 21.

In accordance with the invention, interlocking means are provided for assuring that the operations will be performed in proper sequence so that no can can be sealed if any essential step has been omitted. In a typical operation, starting with the door B' open and with the pad 4 in its power position, a can is placed on the pad 4 and a can end is placed on the magnetic chuck 5. The door B' is closed which automatically will effect operation of the motor E to raise the can until its top edge is spaced approximately one-eighth of an inch below the can end, the parts then being automatically arrested. Thereafter, the establishing of the desired condition in the chamber B will automatically effect further raising of the can until it has been brought into engagement with the can end and is ready for the sealing operation. The seaming rolls 7 and 14 are then brought sequentially into operation by the actuation of a lever 42 which controls mechanism for rotating the cams 13 and 20 which move the rolls 7 and 14 into seaming position. After the seaming operation has been performed, the door B' is opened and the can pad 4 is automatically lowered so that the sealed can may be removed. Having in mind the general interrelation or interlocking engagement of the parts outlined in the foregoing, the particular mechanism for effecting movement of the several parts and the interlocking controls will be understood from the more detailed description which follows.

In order that the chamber B will be tightly sealed when the door B' is closed, the latter is recessed to receive a gasket 43. As shown in Figures 21, 22 and 23, the door B' is provided with a latch bolt 44 having a tapered outer end 45 adapted to be received in a correspondingly tapered opening 46 formed in a keeper 47. The keeper is mounted for sliding movement in a lug 48 projecting from a wall of the chamber B and is urged away from the access opening b by a spring 49 interposed between the lug 48 and a combined spring abutment and shroud 50 held on the keeper 47 by a nut 51. The arrangement is such that if pressure in the chamber B should build up beyond a predetermined desired value, the door B' will be forced to open slightly as permitted by yielding of the spring 49 so as to allow relieving of the pressure between the gasket 43 and adjacent walls of the chamber B.

For withdrawing the bolt 44 so as to permit opening of the closure B', the bolt is formed with a rack portion 52 engaged by a pinion 53 secured to a shaft 54 by a key 55. The shaft 54 is journalled in a cap 56 mounted on the door B', the outer end of the shaft being equipped with a handle 57 keyed to the shaft as at 58. Rocking of the handle 57 will rotate the shaft 54 and pinion 53 so as to move the rack portion 52 and the bolt 44 until the end 45 thereof has been displaced from the keeper opening 46, thereby leaving the door free to be opened.

In order to hold the bolt 44 against turning about its longitudinal axis, it preferably is formed with a longitudinally extending groove 59 into which a ball 60 is pressed by means of a spring 61 housed in a bore 62 in the door. A plug 63 closes the bore 62 and serves as a seat for the spring 61.

It is desirable to place the chamber B in communication with the outside atmosphere before withdrawing the bolt 44 preparatory to opening the door B'. For accomplishing this, a valve 64 is arranged to control communication of the chamber with the atmosphere through a passage 65 formed in a stud 66 secured to the door by a nut 67. The valve 64 is shown as being of a conventional type and includes an operating wing 68. An arm 69 held in place on the wing 68 by screws 70 is pivoted as at 71 to the lower end of a link 72, the upper end of which is pivoted as at 73 to a rock arm 74 secured to the handle 57 by a screw 75.

In operation, when the handle 57 is rocked upwardly, i. e., counterclockwise as viewed in Figure 21 to withdraw the latch bolt from the keeper, the rock arm 74 also will be rocked counterclockwise and will lower the link 72 to rock the arm 69 and thereby rotate the valve wing 68 to open the valve and permit the interior of the chamber B to communicate with the atmosphere through the passage 65 and the valve 64. Rocking of the latch handle 57 in the opposite direction for moving the latch bolt into engagement with the keeper will actuate the arm 74, link 72, and arm 69 so as to close the valve 64.

Referring now to the mechanism for mounting the can pad element 4 and for moving it to position a supported can X in readiness for sealing, a rod 76 is mounted to reciprocate and rotate in a bearing 77 carried by a frame mounted bracket 78 and a bearing 79 in the bottom wall of the chamber B. Packing 80 provides a seal to prevent leakage of air or gas around the rod 76. The pad 4 is equipped with a stub axle 81 rotatable in a bearing 82 recessed in the top of the rod 76. An antifriction bearing assembly 83 preferably is interposed between the pad 4 and the top of the rod 76.

An exteriorly threaded sleeve 84 mounted on the rod 76 is provided with ears 85 which may be clamped tightly against the rod 76 by bolts 86. An internally threaded collar part 87 has threaded engagement with the sleeve 84 and is adapted to be adjustably positioned longitudinally of the rod 76 by being rotated on the sleeve 84. For locking the collar in adjusted position, it may be formed with a slit 88 and equipped with a screw 89 adapted to force apart the metal on opposite sides of the slit to cause the threads of the collar to bind on the threads of the sleeve.

The collar 87 is formed with a circumferential groove 90 which receives oppositely disposed pins 91 and 92 carried by the bifurcated end of an actuating part or lever 93 pivoted as at 94 on the frame A. Mechanism to be described later is provided for rocking the lever 93 in order to raise the rod 76 and pad 4 to move a supported can X into position for seaming. In accordance with the invention, adjustments may be made for placing cans of different heights in seaming position without its being necessary to move the pivot 94 of the lever 93 or to change the range of movement of the lever 93. A preliminary approximate adjustment is made by loosening the bolts 86 and lowering the rod 76 relatively to the sleeve 84 if large cans are to be seamed, or raising the rod 76 if small cans are to be seamed. The approximate adjustment having been made, the bolts 86 are tightened and a final and precise adjustment is made by loosening the screw 89, turning the threaded collar 87 on the sleeve 84, and then re-tightening the screw 89. The adjusting means described above has the advantage of enabling any necessary adjustments to be made for adapting the machine for different sized cans without disturbing the mounting of the lever 93 or the parts which actuate it.

The fluid pressure motor E for operating the lever 93 to lift the cans to sealing position, includes a cylinder 95 and a power actuatable piston member 96 mounted to reciprocate therein. A rod 97 connected to the piston extends downwardly for pivotal connection as at 98 to a mechanism lever 99 pivoted as at 100 on the frame A.

The lower end of a vertically extending link 101 is pivoted as at 102 to the lever 99. The top end of the link 101 is reduced in diameter as at 103 and passes through a swivel block 104 pivoted on a pin 105 secured to a boss 106 on the lever 93 by a set screw 107. The swivel block 104 is formed with an opening 108 which snugly receives the link reduced end 103 for sliding movements. The link reduced end 103 also extends through an opening 109 in the pin 105, the opening 109 preferably being enlarged as shown in Figure 6 to permit slight rocking movement of the link 103 with respect to the pin 105.

A washer 110 is interposed between the bottom of the swivel block 104 and a shoulder 111 on the link 102, and yieldable means are provided for holding the block 104 down against the washer 110. In the form shown, the link reduced end 103 is threaded to receive a nut 112 which acts as an abutment for a washer 113 which forms a seat for a force transmitting spring 114 which abuts against the top of the swivel block 104. Adjustment of the nut 112 on the link end portion 103 will vary the pre-loading of the spring 114. A lock nut 115 may be provided for holding the adjusting nut 112 against accidental rotation.

A spring 116 interposed between the pivot 102 and a bracket 117 on the frame A normally holds the link 101 elevated, holds the piston rod 97 and piston 96 down, and holds the rod 76 and can pad 4 in their lower positions.

In operation, when the piston 96 is moved upwardly by evacuation of the cylinder 95, the rod 97 will be raised to rock the lever 99 and pull downwardly on the link 101. The downward pull of the link 101 will be transmitted through the nut 112 and spring 114 to the swivel block 104 and pin 105, moving the latter downwardly to rock the lever 93 clockwise as viewed in Figure 2 so as to raise the rod 76 and the can pad 4.

Figure 4:
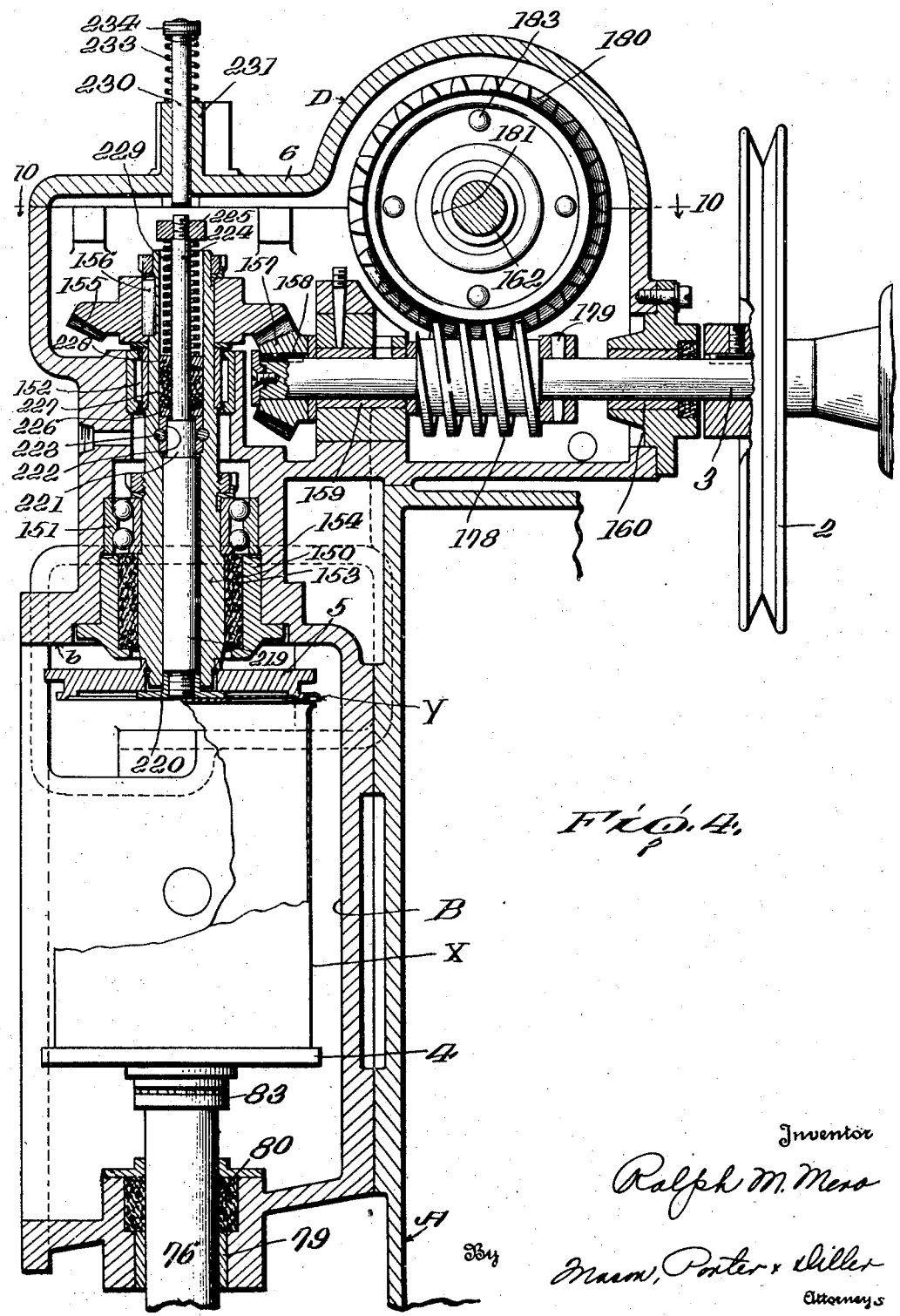
Figure 4 is an enlarged fragmentary vertical section on the line 4—4 of Figure 3, some parts being omitted in order that other parts may be shown more clearly, the illustrated parts being shown in the positions occupied when a can has been raised toward a can end but has been arrested to leave a small space between the can and the can end.

In accordance with the invention, the raising of the can pad is stopped automatically when the top edge of the can X has reached a position about one-eighth of an inch below the can end Y held by the magnetic chuck 5, the parts being held with the can thus spaced from the can end as shown in Figure 4 until after a predetermined gaseous condition has been established in the chamber B. In the mechanism shown, a rod 118 connected to the pivot pin 105 extends upwardly through and for sliding movements in a bracket 119 secured to the frame by bolts 120. The rod 118 is threaded adjacent its upper end to receive a nut 121 held in adjusted position by a locking nut 122. Stop arms 123 pivoted on the bracket 119 as at 124 extend under the nut 121 on opposite sides of the rod 118. Normally the arms 123 are held in the position shown in Figure 5 by a stop 125 carried on arms 126 pivoted as at 127 on the bracket 119. When the arms 126 are rocked to the position shown in dotted lines in Figure 5, the stop 125 will move from under the arms 123 so as to permit the latter to swing downwardly about the pivot 124, thus releasing the nut 121 and rod 118 for slight further downward movement. The spring 114, having previously been loaded, will then expand so as to move the swivel block 104 downwardly so as to rock the lever 93 and raise the rod 76 and pad 4 further until the top edge of the can X is in engagement with the can end Y in readiness for the seaming operation.

Figure 2:
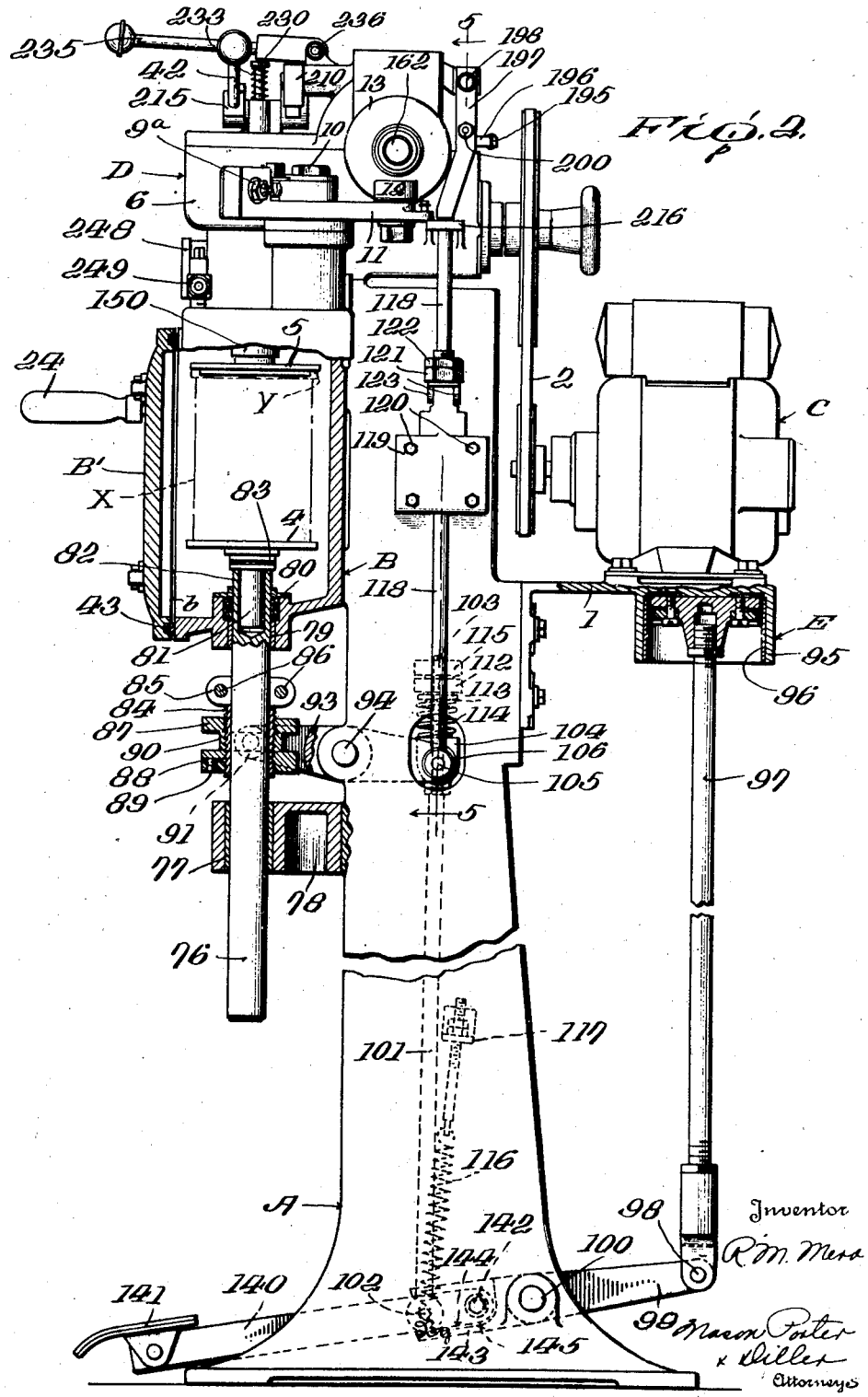
Figure 2 is a side view on an enlarged scale, partly in elevation and partly in section, the parts being shown in the position they occupy when a can and can end are cooperatively positioned in readiness for seaming.

In accordance with a feature of the invention, the final raising of the can into engagement with the can end as shown in Figure 2 is effected automatically in response to establishing of the desired gaseous condition in the chamber B. For accomplishing this automatic control, a rod 128 is mounted to slide in a bearing 129 secured to the frame A and is pivoted as at 130 to the stop 125. A spring 131 interposed between the bearing 129 and a shoulder 132 of the rod constantly urges the rod 128 and consequently the arms 126 and stop 125 to the positions shown in full lines in Figure 5 wherein the stop 125 is in operative engagement with the arms 123.

Figure 3:
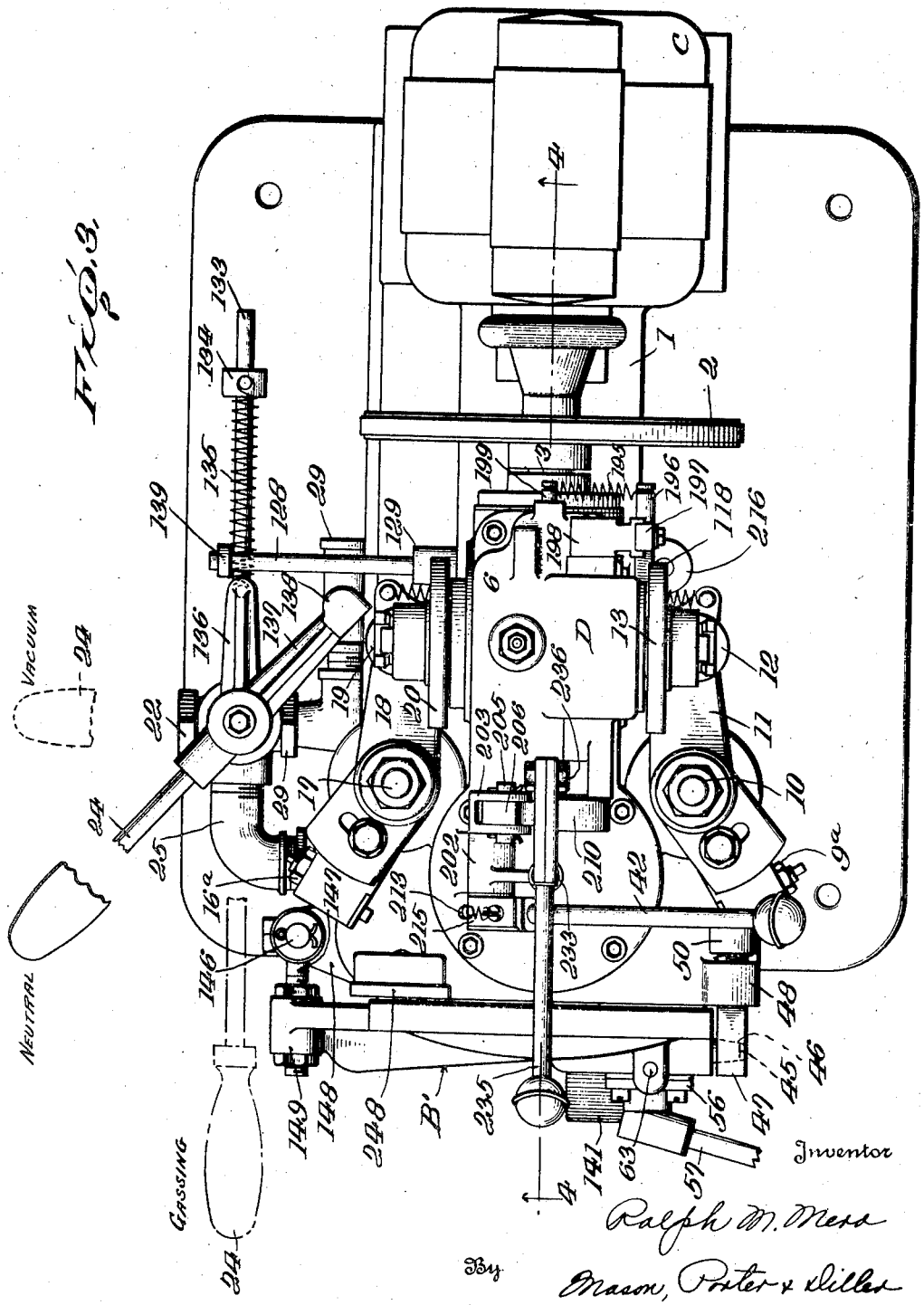
Figure 3 is a top plan view of a machine embodying the invention and drawn on a larger scale than Figure 1.

As shown in Figure 3, a rod 133 mounted on and extending from the casing of the valve 23 is provided with a collar 134 on which is anchored one end of a spring 135, the other end of which is connected to an arm 136 rotatable in unison with the valve handle 24. The spring 135 yieldably holds the valve rotor 23$^a$ in neutral position as shown in Figure 25. An extension 137 on the valve handle 24 is formed with a heel 138 adapted to engage a collar 139 on the rod 128 when the valve is moved to the position for admitting gas to the chamber B.

In operation, when the valve handle 24 is rocked counterclockwise as viewed in Figure 3, the heel 138 carried by the extension 137 will engage the collar 139 and move the rod 128 so as to disengage the stop 125 from the arms 123, the operation of the parts being timed to effect this disengagement only after gas has been admitted through the valve 23 to the chamber B. Preferably the operator stops moving the valve handle 24 when the valve 23 reaches gassing position and the heel 138 just contacts the collar 139. When the gauge 248 indicates that the desired pressure has been established in the chamber B the handle 24 is moved further to move the rod 128 and disengage the stop 125 from the stop arms 123 as previously explained. As soon as the stop 125 has been disengaged from the arms 123, the latter can move to permit the rod 118 to move downwardly so that the previously loaded spring 114 may expand and rock the lever 93 to raise the rod 76 and pad 4 and move the can X up into engagement with the can end Y as shown in Figure 2.

At times it may be desirable to operate the rod 102, the lever 93, and the rod 96 manually instead of by means of the fluid pressure motor E. Manual operation may be accomplished through the medium of any conveniently disposed operating part actuatable by an attendant's hand or foot. In the form shown, a treadle member 140 equipped with a foot pad 141 is pivoted as at 142 on the lever 99 and overlies a flange 143 provided on the lever 99. The lower surface portion of the treadle 140 between the pivots 102 and 142 serves as a pressure face 144 engageable with a pressure face 145 on the top of the lever flange 143 to provide a one-way drive connection between the treadle and the lever 99. Thus, when the treadle 140 is depressed so as to rock counterclockwise, the pressure face 144 will bear upon the pressure face 145 and the treadle and lever 99 will have to rock together about the pivot 100. However, if the fluid motor E is operated for actuating the link 101 and the parts connected thereto, the lever 99 may be rocked counterclockwise by the motor E even though some obstruction should come between the bottom of the treadle 140 and the base of the frame or the floor. Consequently, the treadle 140 may yield so as to prevent damage to the machine or injury to an operator's foot should it inadvertently be extended under the treadle.

In the preferred procedure for adjusting the apparatus for sealing cans of a particular height, the bolts 86, which clamp the split collar 84, and the nuts 121 and 122 on the rod 118 are backed off. A can with a cover resting loosely thereon is placed on the pad 4 and the rod 76 is raised until the can and cover are pressed firmly against the chuck 5. While holding the can and cover in this position, the treadle 140 is pressed down as far as it will go and the screws 86 are re-tightened. Then the set screw 89 is loosened and the collar 87 is turned until there is a predetermined gap, preferably about one-sixteenth inch between the swivel block 104 and the washer 110 on the link 101. The correct positioning of the parts also may be determined by the position of the pin 105 relative to a fixed point or mark on the frame A. The set screw 89 is then tightened. This adjustment should be made with the piston 96 at the limit of its upstroke. The nuts 121—122 are then re-set so that the nut 121 will engage the stop arms 123 when the can X is spaced the desired predetermined distance, for example one-eighth inch, below a can end Y held by the chuck 5. If the chucking pressure exerted by the spring 114 is not just right after the parts have been adjusted as explained above, a final adjustment may be made by turning the nuts 112—113 on the rod 118.

The hydraulic motor E preferably is operable in response to movement of the door B' for raising the can support 4 when the door is closed and for lowering the can support when the door is open. To this end, a hinge pin 146 pivoted in frame lugs 147 is equipped with arms 148 which are secured to lugs 149 on the door B'. The lower end of the pin 146 is operatively connected to the rotor 39ᵃ of the valve 39.

In operation, when the door is swung to open position, the hinge pin 146 is rotated to place the valve rotor 39ᵃ in the position shown in Figure 28 wherein the pipe 37 leading from the hydraulic motor E communicates with the atmosphere through the passage 39ᵇ and opening 40. Consequently, atmospheric pressure will act upon both the upper and lower faces of the piston 96, and the piston will be moved to its lower position by the spring 116 which will return the can pad 4 to its lower position. When the door is swung to closed position, the hinge pin 146 will turn so as to move the valve rotor 39ᵃ to the position shown in Figure 29 wherein the cylinder 95 communicates through the conduit 37, the passages 39ᶜ and 39ᵇ with the conduit 41 leading to the conduit 22 and the vacuum pump 21. Evacuation of the cylinder 95 will effect raising of the piston 96 and lowering of the rod 101 to elevate the can pad 4 in the manner previously described.

The seaming of the cans and applied can ends is effected by rotating them and sequentially pressing the first and second operation seaming rolls 7 and 14 into engagement with the seam-forming can and can end portions. The can and can end are rotated by the chuck 5 which is mounted on a sleeve 150 journalled in bearings 151 and 152 on the casing 6 of the seaming unit D. Packing 153 held in place by a gland member 154 prevents leakage of gas or air around the sleeve. For driving the sleeve 150, a bevel gear 155 keyed at 156 to the sleeve meshes with a bevel gear 157 keyed at 158 to the shaft 3 which is journalled in bearings 159 and 160 on the casing 6.

When the machine is in operation or prepared for operation, the shaft 3 and consequently the chuck 5 will rotate constantly. However, the seaming rolls 7 and 14 normally are in retracted positions as indicated in dotted lines in Figure 10, and are moved into and maintained in operative positions only when called for by the operator and only for a predetermined period of operation. The mechanism for effecting movement of the seaming rolls 7 and 14 to their operative positions includes the first and second operation cams 13 and 20 and a clutch for transmitting to the cams driving effort sufficient in duration to effect only a single revolution of each cam.

The first operation cam 13 is keyed as at 161 to a shaft 162 journalled in antifriction bearings 163 carried by the casing 6, the direction of rotation of the cam 13 being indicated by the arrow 164 in Figure 11. As shown in Figures 11 and 13, the first operation cam includes a low dwell portion 165, a steep rise portion 166, a gradual rise portion 167, a more gradual rise portion 168, a high dwell portion 169, and a drop off portion 170. Figure 11 shows approximately the relative positions of the cam 13 and follower roller 12 when the cam is at rest before a seaming operation has been begun. When the cam starts to rotate, the steep rise portion 166 will engage the roller 12 to move the latter and rock the arm 11 for moving the first operation roller 7 into seaming position. During further rotation of the cam, the gradual rise portions 167 and 168 will move the roller 12 progressively further to effect increasing pressure of the seaming roll 7 upon the seam. The sealing pressure will be maintained while the high dwell portion 169 is passing in contact with the roller 12, and finally the drop off portion 170 will pass the follower roller 12, permitting the seaming roll 7 to be moved back to its inoperative position. The cam will then have been returned to the position shown in Figure 11 and will come to rest.

The second operation cam 20 is keyed as at 171 to the shaft 162 and rotates in the direction of the arrow 172 shown in Figure 12. The cam 20 includes a low dwell portion 173, a steep rise portion 174, a gradual rise portion 175, a high dwell portion 176, and a drop off portion 177. In operation, after the cam 20 begins to move, it will rotate in the direction of the arrow 172 in Figure 12 until the low dwell portion 173 has moved past the follower roller 19. During this time no movement of the roller 19 will take place. After the low dwell portion 173 has passed the roller 19, the latter will be engaged consecutively by the steep rise portion 174, the gradual rise portion 175, and the high dwell portion 176 for moving and holding the second operation seaming roll 14 in seaming position. Finally the drop off cam portion 177 will pass the roller 19, permitting the second operation seaming roll 14 to be retracted and the cam 20 will be brought to rest.

It will be seen that during a single revolution of the shaft 162 and the cams 13 and 20, there first will be a period during which the first operation seaming roll is brought into seaming position while the second operation seaming roll 14 remains inactive, after which the second operation seaming roll will be moved to operative position and the first operation seaming roll will be moved to inactive position. Finally the second operation seaming roll will be moved to its inactive position.

Figures 11 and 12 are marked to indicate angular extents of the several portions of the cams 13 and 20. Cams having the rise, dwell, and drop off portions of the angular extents indicated, are best adapted for use in the illustrative embodiment of the invention, but it will be understood that the angular dimensions of the cam portions are not disclosed in limitative sense.

The clutch mechanism for imparting a single revolution to the shaft 162 and the cams 13 and 20 is driven from the shaft 3. A worm 178 keyed as at 179 to the shaft 3, meshes with a worm wheel 180 supported on a bushing 181 carried by the shaft 162, the worm 180 being free to turn with respect to the shaft 162. An internally toothed clutch ratchet ring 182 is secured to the worm wheel 180 by rivets 183 and surrounds a rotatable hub member 184 keyed as at 185 to the shaft 162. A pawl 186 pivoted as at 187 on the hub 184 is adapted to drivingly engage the teeth of the ring 182 as shown in Figure 19.

The pawl 186 is urged into its ring engaging position by a plunger 188 mounted to slide in a bore 189 in the hub and being pressed against the pawl 186 by a spring 190. The worm gear 180 and consequently the ratchet ring 182 are driven in the direction of the arrow 191 in Figure 19, so that when the pawl is in its ring engaging position, the hub 184 and the shaft 162 will be driven by the worm gear 180.

Normally, however, the pawl 186 is held depressed as shown in Figure 16 by means of a clutch trip finger 192 keyed as at 193 on a rock shaft 194 pivotally mounted in the seaming head casing 6. When the pawl 186 is held depressed, it is out of engagement with the ratchet ring 182 so that rotation of the latter will not drive the hub 184. Consequently the shaft 162 and the cams 13 and 20 will remain stationary even though the shaft 3 and chuck 5 rotate continuously.

The trip finger 192 occupies a zone of limited extent circumferentially of the hub 184 and normally is held in clutch-disengaging position by a spring 195 secured at one of its ends to a pin 196 on an arm 197 secured as at 198 to the shaft 194. The other end of the spring 195 is anchored to the casing 6 as at 199. A screw 200 carried by the arm 197 is engageable with the casing 6 for limiting movement of the arm 197, the shaft 194, and the trip finger 192 under the urge of the spring 195.

In accordance with the invention, manually operable means are provided for momentarily rocking the trip finger 192 clear of the pawl 186 so as to permit the latter to engage the ring 182 to be driven thereby and to drive the hub 184 and shaft 162. The arrangement is such that soon after the pawl 186 moves away from the trip finger 192, the latter will be returned automatically to the position shown in full lines in Figure 15 and also shown in Figure 16. When the hub 184 has nearly completed a single revolution, the pawl 186 will move into the circumferential zone of the trip finger 192 and will engage the trip finger 192 and be cammed or moved out of engagement with the ring 182 so as to bring the hub 184 to rest in the position shown in Figure 16.

The engaging and disengaging of the clutch is effected by mechanism actuatable by the manually operable lever 42 secured to a shaft 201 pivoted in a boss 202 on the casing 6. A bifurcated arm 203, fixed to the shaft 201 by a key 204, is equipped with a pivot pin 205 which mounts a finger 206 urged to the position shown in Figure 18 by a spring 207. A heel 208 on the finger 206 is engageable with a stop face 209 on the arm 198 for limiting movement of the finger 206 under the urge of the spring 207. A finger 210, keyed as at 211 to the rock shaft 194, normally engages the finger 206 so as to be held in the position shown in Figure 18, wherein the shaft 194 and trip finger 192 secured thereto are maintained in their pawl holding position shown in Figures 15 and 16.

In operation, when the operating handle 42 is given a single stroke downwardly, the arm 203 and finger 206 will move clockwise as viewed in Figure 18, thereby rocking the finger 210 and shaft 194 counterclockwise against the urge of the spring 195 so as to move the trip finger 192 to the position shown in dotted lines in Figure 15. Thus, the pawl 186 will be permitted to engage the ring 182, and the hub 184, shaft 162 and cams 13 and 20 will be driven.

When the finger 206 passes out of contact with the finger 210 during the single operating stroke of the lever 42, the finger 210 will be free to be returned to the position shown in Figure 18. Consequently the spring 195 will rock the shaft 194 and the trip finger 192 will be returned to its pawl holding position before a complete revolution of the hub 184, shaft 162 and cams 13 and 20 has been effected.

When the operating lever 196 is returned to its initial position, the top surface 212 of the finger 206 will engage the finger 210. The spring 207 will yield to permit the finger 206 to move under the finger 210 until the arm 203 has been swung sufficiently to permit the finger 206 to move clear of the finger 210 and to then be returned to its starting position by the spring 207.

For returning the lever 42 to its initial position and yieldably holding it there until it again is moved by the operator, a spring 213 anchored on the casing 6 as at 214, extends in contact with and is secured to a block 215 at the inner end of the handle 42.

Means are provided for preventing actuation of the clutch control handle 42 to effect engaging of the clutch except when the can pad 4 is raised to its uppermost position and the can X is in contact with the can end Y and in readiness for sealing. As shown in Figures 2 and 5, the rod 118 previously referred to, extends upwardly beyond the bracket 119 to be guided for sliding movement in a guide lug 216 on the frame A (see Figure 2). When the can pad 4 is in a position other than its fully raised position, the top of the rod 118 will extend above the lug 216 so as to overlap the lower end of the arm 197 as shown in Figure 16 and to act as a stop to prevent swinging of the arm. In operation, when the can pad 4 moves to its completely raised position, the rod 118 will move downwardly beyond the lower end of the arm 197 as shown in Figure 2, leaving the arm 197 free to be rocked when the clutch control lever 42 is moved to rock the shaft 194 and clutch trip finger 192. Thus, the top of the rod 118 acts as a stop cooperable with the arm 197 for preventing engagement of the clutch and operation of the seaming means except when the can and can end are placed in readiness for sealing. The stop comprised by the upper end of the rod 118 is responsive to placing of the can and can end in readiness for sealing for permitting operation of the clutch.

Means are provided for forcibly dislodging a sealed container from the magnetic chuck 5. An ejector stem 219 is mounted to slide vertically within the sleeve 150 and is provided at its lower end with a knock-out pad 220. Intermediate its ends, the stem is formed with a reduced portion 221 slidable in a bearing 222 secured as at 223 inside of the sleeve 150. The upper end portion of the stem is further reduced as at 224 and is equipped with a collar 225. A packing washer 226 surrounding the stem portion 224 abuts against the bearing 222. Packing material 227 is positioned between the washer 226 and an upper washer 228 pressed downwardly by a spring 229 interposed between the washer 228 and the collar 225. The spring 229 serves to compress the packing material 227 as well as to urge the stem 219 and knock-out pad 220 to their upper or retracted positions.

For projecting the stem 219 downwardly, a rod 230 is mounted for vertical sliding movements in a guide 231 on the unit head casing 6, the rod 230 being axially aligned with the ejector stem 219. A spring 233 interposed between the top of the guide 231 and a collar 234 on the rod 230 normally holds the rod elevated so that its lower end is spaced above the top of the stem 219.

A lever 235 pivoted as at 236 on the casing 6 overlies the top of the rod 230 and is adapted, upon being depressed, to push downwardly on the rod 230, causing the latter first to move into engagement with the knock-out stem 219 and then to move the stem and pad 220 downwardly to eject the sealed container. Normally the lever 235 and rod 230 are not connected to the stem 219 and the rod 230 is spaced above the stem 219 except during an actual can ejecting operation. Consequently the likelihood of the ejector's sticking in projected position is minimized.

The operation of the valve 23 for controlling the vacuumizing and gassing of the chamber B, and the operation of the valve 39 for controlling the operation of the motor E has already been described. The control means shown in Figure 24 further includes means for automatically cutting off the flow of gas to the chamber B when a predetermined gas pressure has been built up in the chamber. In the form shown, the cut off valve 31 is arranged to be operated by a solenoid 237. A conductor 238 leads from the cylinder to one side 239 of a current supply line. A conductor 240 leads from the cylinder through a switch 241 to a conductor 242, which is connected to the other side 243 of the current supply line. The switch 241 is adapted to be operated by means generally indicated at 244 which communicates through a conduit 245 with the interior of the chamber B. The means 244 is responsive to attainment of the desired pressure in the chamber B for operating the switch 241 and solenoid 237 to close the valve 31.

In order to remove residual air from the gas conduit 29 preparatory to operation of the machine, a by-pass conduit 246 equipped with a valve 247 is interposed directly between the conduit 29 and the conduit 22 leading to the vacuum pump 21. In preparing for operation, the valve 247 is opened so as to draw a vacuum in the conduit 29, removing residual air therefrom, and is then closed.

The chamber B may be equipped with a pressure gauge 248 and safety valve 249.

Figures 30, 31 and 32 show a modified construction for adjusting or adapting the machine for sealing cans of different sizes. The grooved collar 87 is operable by the pins 91 and 92 on the lever 93 as in the construction previously described. In the modification, the collar has threaded connection with a sleeve 250 which is slidable on a rod 251, the upper end of which supports the can pad 4 (not shown in Figures 30, 31 and 32), the rod 251 performing the same function as the rod 76 in the previously described embodiment. Suspended from the sleeve 250 as at 252 is an adjustment frame 253 formed at its lower end with a guide 254 which receives the bottom of the rod 251 for vertical sliding movements. The collar 87 and adjustment frame 253 together constitute a member connecting the actuating part (lever 93) to the rod 76 which carries the can support 4.

Pivoted as at 255 on the frame 253 is a gear sector 256 which meshes with a rack 257 formed on the lower end portion of the rod 251. A handle 258 secured to the gear sector 256 provides for rotating the gear and thereby moving the rack 257 and rod 251 vertically with respect to the frame 253 and collar 87.

For releasably holding the parts in selected positions of adjustment, a button 259 fits over a boss 260 on the outer end of the handle 258. A stem 261 secured to the button 259 extends into the boss 260 and is provided with a head 262 urged toward the frame 253 by a spring 263. The frame is provided with a plurality of apertures 264 which constitute locking stations, each adapted to receive the head 262 for maintaining the handle 258 and associated parts in adjusted position. When it is desired to change the adjustment, the button 259 is pulled away from the handle 258 against the urge of the spring 263 so as to move the head 262 clear of the frame 253. The handle 258 is then rotated until the can pad 4 is positioned properly in accordance with the size of the can to be sealed, and the button 259 is then released so as to permit the head 262 to move into the then adjacent locking aperture 264.

A pin 265 secured to the adjustment frame 253 is slidable between guides 266 on the frame A for holding the frame 253 against turning.

A typical operation of the machine for conditioning and sealing a container will be set forth briefly. At the start, the door B' will be open and the valve rotor 39ª will be in the position shown in Figure 28, so that the cylinder 95 will communicate with the atmosphere and the link 101 will be held up by the spring 116. The piston 96 will be in its lower position, the can pad 4 will be in its lower position, and the rod 118 will be in its upper position so that its top end will overlap the arm 197 as shown in Figure 16. The clutch pawl 186 will be in its disengaged position as shown in Figure 16.

To prepare for the conditioning and sealing of the can, the by-pass valve 247 is opened to remove residual air from the conduit 29, and is then closed. A can X is placed on the can pad 4 and a can end Y applied to the magnetic chuck 5. The door B' is closed, thereby moving the valve rotor 39ª to the position shown in Figure 29 and placing the cylinder 95 in communication with the vacuum pump. The piston 96 will be moved upwardly to rock the lever 99 and pull downwardly on the link 101 and rod 118, thereby rocking the lever 93 and raising the can pad 4 and can X to the positions shown in Figure 4. When the stop nut 121 on the rod 118 engages the arms 123, movement of the rod 118, lever 93 and rod 76 will be arrested and continued movement of the link 101 will compress and load the spring 114.

The valve lever 24 is then operated to place the condition determining valve rotor 23ª in the position shown in Figure 27, wherein the chamber B is in communication with the vacuum pump 21. Then the valve handle 24 is moved to position the valve rotor 23ª as shown in Figure 26 to place chamber B in communication with the gas conduit 29. When the desired predetermined gas pressure is built up in the chamber B, the solenoid operated valve 31 will close.

During the latter part of the movement of the valve handle 24 to its chamber gassing position, the heel 138 carried by valve handle arm 137 will engage the collar 139 and move the rod 128 so as to shift the stop 125 to the position shown in dotted lines in Figure 5, thereby disabling the arms 123 and permitting the rod 118 to be moved downwardly by the loaded spring 114. This will raise the can pad 4 to position the can X against the can end Y as shown in Figure 4 in readiness for sealing. The valve handle 24 may then be returned to its neutral position.

The clutch control lever 42 is then given a single stroke to momentarily release the clutch trip finger 192 from the clutch pawl 186. The clutch hub 184, the shaft 162, and the cams 13 and 20 will then be given a single complete revolution and will come to rest when the pawl 186 reengages the trip finger 192. During rotation of the cams 13 and 20, the seaming rolls 7 and 14 will be moved successively into seaming position and will then be retracted.

The door handle 57 will then be rocked to retract the latch bolt 44 and open the valve 64, so as to place the chamber B in communication with the atmosphere and equalize pressure on the inside and outside of the door, permitting it to be opened easily. Ordinarily the pressure of the gas in the chamber will be lower than atmospheric, so that opening of the valve 64 will greatly facilitate opening of the door.

The construction disclosed herein embodies the invention in the form now preferred, but it will be understood that changes may be made without departing from the invention as defined in the claims.

What I claim is:

1. In a container sealing machine, a sealing chamber, a closure for said chamber, a container supporting element mounted in said chamber independently of said closure, sealing means including a container end chuck element in said chamber, power operated means for moving one of said elements relatively toward the other of said elements, and means including an element operatively connected to said closure and being responsive to movement of said closure to closed position for effecting operation of said power operated means for bringing about said relative movement of said elements.

2. In a container sealing machine, a sealing chamber, a closure for said chamber, a container supporting element mounted in said chamber independently of said closure, sealing means including a container end chuck element in said chamber, a pressure responsive piston operatively connected to one of said elements, a cylinder in which said piston is mounted, and means for changing the pressure in said cylinder to effect movement of said elements relatively toward each other in response to closing of said closure and to effect movement of said elements relatively away from each other in response to opening of said closure.

3. In a container sealing machine, a sealing chamber, a closure for said chamber, a container supporting element mounted in said chamber independently of said closure, sealing means including a container end chuck element in said chamber, a pressure responsive piston operatively connected to one of said elements, a cylinder in which said piston is mounted, a source of pressure, a valve controlling communication of said source of pressure with said cylinder and being settable selectively to open position and to closed position respectively, and means connecting said closure to said valve and being responsive to movement of said closure for setting said valve in one of its said positions when said closure is in open position and for setting said valve in the other of its said positions when said closure is in closed position.

4. In a container sealing machine, a sealing chamber, a closure for said chamber, a container supporting element in said chamber, sealing means including a container end chuck element in said chamber, a pressure responsive piston operatively connected to one of said elements, a cylinder in which said piston is mounted, a source of pressure, a valve controlling communication of said source of pressure with said cylinder, and means connected to said closure and connected to said valve for opening the valve when the closure is moved to closed position and for closing the valve when said closure is moved to open position.

5. In a container sealing machine, a sealing chamber, a container supporting element in said chamber, sealing means including a container end chuck element in said chamber, means for establishing a predetermined gaseous condition within said sealing chamber, and power-operated mechanism for effecting first a movement of one of said elements relatively towards the other of said elements limited to leave a space between a supported container and a chucked container end and then a further relative movement of said one of said elements to bring said container and said container end into position ready for sealing, said mechanism including means responsive to operation of the means which establishes said gaseous condition for automatically effecting said further movement of said other of said elements.

6. In a container sealing machine, a sealing chamber, a container supporting element in said chamber, sealing means including a container end chuck element in said chamber, means for establishing a predetermined gaseous condition within said sealing chamber, power-operated mechanism for urging one of said elements relatively towards the other of said elements, stop means for arresting said relative movement of said one of said elements when a supported container and chucked container end are spaced a predetermined distance apart, and means responsive to operation of the means which establishes said predetermined gaseous condition in said chamber for rendering said stop means ineffective and thus enabling said power operated mechanism to move said one of said elements relatively further towards said other of said elements to bring said container and said container end into position ready for sealing.

7. In a container sealing machine, a sealing chamber, a container supporting element in said chamber, sealing means including a container end chuck element in said chamber, means for establishing a predetermined gaseous condition within said sealing chamber, operating means, connections including a spring for transmitting drive from said operating means to one of said elements for urging it toward the other of said elements, stop means engageable with said connections between said spring and said one of said elements whereby during operation of said operating means after engagement of said stop means with said connections said stop means will arrest movement of said one of said elements when a supported container and chucked container end are spaced a predetermined distance apart and further operation of said operating means will load said spring, and means responsive to operation of the means which establishes said gaseous condition for disengaging said stop means from said connections to thereby enable said spring to move said one element further and bring said container and said container end into position ready for sealing.

8. In a container sealing machine, a sealing chamber, a container supporting element in said chamber, sealing means including a container end chuck element in said chamber, condition determining means adapted to communicate with said chamber for establishing a desired gaseous condition therein, a valve controlling communication of said condition-determining means with said chamber, valve operating means, a reciprocable rod on which one of said elements is mounted, means mounting said rod to move towards and from the other of said elements, a stop for arresting movement of said rod when it has moved to a position such that a supported container and chucked container end are spaced a predetermined distance apart, rod operating means including a force-transmitting spring for first moving said rod to its arrested position determined by said stop and then loading said spring, and means operable by said valve operating means for disabling said stop when said valve has been actuated to place said condition-determining means in communication with said chamber.

9. In a container sealing machine, a sealing chamber, a container supporting element in said chamber, sealing means including a container end chuck element in said chamber, means for drawing a vacuum, a source of gas, valve means for controlling communication of said chamber with said vacuum drawing means and said gas source selectively, power operated mechanism for effecting first a movement of said elements relatively towards each other limited to leave a predetermined space between a supported container and a chucked container end and then a further relative movement of said elements to bring said container and said container end into position ready for sealing, said mechanism including a motor, a yieldable driving connection between said motor and one of said elements, and means for arresting the relative movement of said elements when the container and container end are predeterminately spaced as specified, and means operable only in response to the actuation of said valve means which places said chamber in communication with said gas source for disabling said arresting means and thereby enabling said power operated mechanism to move said elements automatically further toward each other and to thus place a supported container and container end in position ready for sealing.

10. In a container sealing machine, a sealing chamber, a closure for said chamber, a container supporting element in said chamber, sealing means including a container end chuck element in said chamber, power operated means for moving one of said elements relatively toward the other of said elements, stop means for arresting said relative movement when a supported container and chucked container end are spaced a predetermined distance apart, means including an element operatively connected to said closure and being responsive to movement of said closure to closed position for effecting operation of said power operated means to move said one element until arrested by said stop means, means for establishing a predetermined condition in said chamber, and means responsive to establishing of said condition for disabling said stop means and thereby permitting said operating means to move said one element further and to thus place said container and said container end relatively in position ready for sealing.

11. In a container sealing machine, a sealing chamber, a closure for said chamber, a container supporting element in said chamber, sealing means including a container end chuck element in said chamber, power operated means for moving one of said elements relatively toward the other of said elements, stop means for arresting said relative movement when a supported container and chucked container end are spaced a predetermined distance apart, means responsive to movement of said closure to closed position for effecting operation of said power operated means to move said one element until arrested by said stop means, a source of gas, a valve controlling communication of said source with said chamber, valve operating means, and means responsive to actuation of the valve operating means for disabling said stop means to thereby enable said operating means to move said one element further and to thus place said container end in position ready for sealing.

12. In a container sealing machine, a container supporting element, sealing means including a container end chuck element, a reciprocable rod on which one of said elements is mounted, means mounting said rod to move towards and from the other of said elements, means for operating said rod, connections between said operating means and said rod including a force-transmitting spring, stop means for arresting movement of said rod toward the other of said elements when a supported container and chucked container end are spaced a predetermined distance apart, and while said rod operating means continues in operation to load said spring, and means for disabling said stop means to thereby enable the loaded spring to move said rod further and to thus place said container and said container end relatively in position ready for sealing.

13. In a container sealing machine, a container supporting element, sealing means including a container end chuck element, and mechanism for effecting movement of one of said elements relatively toward the other of said elements, said mechanism including a power actuatable member, means connecting said member to said one of said elements, a manually operable member, and a one-way drive connection between said manually operable member and said one of said elements, said drive connection being effective to transmit drive from said manually operable member to said one of said elements but being incapable of interfering with operation of said power actuatable member if free movement of said manually operable member is obstructed.

14. In a container sealing machine, a container supporting element, sealing means including a container end chuck element, and mechanism for effecting movement of one of said elements relatively toward the other of said elements, said mechanism including a power actuatable member, a mechanism lever, a connection from said power actuatable member to said mechanism lever, a connection from said one of said elements to said mechanism lever, a manually operable lever pivoted on said mechanism lever, a first pressure face on said mechanism lever, and a pressure face on said manually operable lever engageable with said first pressure face for moving said mechanism lever when said manually operable lever is rocked in one direction, said manually operable lever being free to move in the opposite direction relatively to said mechanism lever.

15. In a machine for sealing containers, a container supporting element, a container end chuck element, means for moving one of said elements towards the other of said elements for placing a supported container and a chucked container end relatively in position ready for sealing, means for forming a seal between the container and the container end, means for driving said seal-forming means, a device for moving said seal forming means to seal forming position, connections including a normally disengaged clutch interposed between said driving means and said device, clutch controlling means, manually actuatable means operative in a single continuous stroke for first operating the clutch controlling means to engage the clutch and then releasing the clutch controlling means before return stroke movement of the manually actuatable means, a stop normally positioned to prevent operation of said manually actuatable means, and means connecting the movable one of said elements to said stop for shifting said stop to ineffective position in response to positioning of said elements which places the container and container end in position ready for sealing.

16. In a machine for sealing containers, a container supporting element, a container end chuck element, positioning means for moving one of said elements towards the other of said elements for placing a supported container and a chucked container end relatively in position ready for sealing, a reciprocable rod operatively connected to said positioning means, means for forming a seal between the container and the container end, means for driving said seal-forming means, a device for moving said seal forming means to seal forming position, connections including a normally disengaged clutch interposed between said driving means and said device, means including a shaft rockable for effecting engagement of said clutch, an arm on said shaft engageable with said rod for holding said shaft against rocking when said elements are not positioned to place said container and container end in position ready for sealing, said arm being so placed as to be released by said rod to permit rocking of said shaft when said elements are positioned to place said container and container end in readiness for sealing, and manually actuatable means operative upon said shaft in a continuous stroke for rocking the shaft to effect engagement of said clutch and then releasing said shaft before return stroke movement of said manually actuatable means.

17. In a container sealing machine, means for supporting a container and a container end in position to be seamed, seaming means, driving means, a ratchet ring driven by said driving means, a rotatable member drivingly connected to said seaming means, a pawl carried by said rotatable member, means for urging said pawl into engagement with said ratchet ring, a trip finger normally contacting said pawl within a predetermined circumferential zone to hold said pawl disengaged from said ratchet ring, manually actuatable means operative upon said trip finger in a continuous stroke for moving said finger away from said pawl and then releasing said finger to render it free to return to pawl-engaging position whereby said finger is disengaged from said pawl for a limited period sufficient to permit said pawl to engage said ratchet ring and be moved circumferentially thereby out of said zone, and means for returning said trip finger to its initial position whereby said pawl, upon again moving into said circumferential zone, will be contacted by said trip finger and thereby disengaged from said ratchet ring.

18. In a container sealing machine, a sealing chamber, a container supporting element in said chamber, sealing means including a container end chuck element in said chamber, means for establishing a predetermined gaseous condition within said sealing chamber, operating means for urging one of said elements relatively toward the other of said elements, stop means for arresting said relative movement of said one of said elements when a supported container and chucked container end are spaced a predetermined distance apart, and means responsive to establishing of said predetermined gaseous condition in said chamber for rendering said stop means ineffective and thus enabling said operating means to move said one of said elements relatively further toward said other of said elements to bring said container and said container end into position ready for sealing, said operating means including a power actuatable member, means connecting said member to said one of said elements, a manually operable member, and a one-way drive connection between said manually operable member and said one of said elements, said drive connection being effective to transmit drive from said manually operable member to said one of said elements but being incapable of interfering with operation of said power actuatable member if free movement of said manually operable member is obstructed.

19. In a container sealing machine, a sealing chamber, a container supporting element in said chamber, sealing means including a container end chuck element in said chamber, a source of gas, a conduit for providing communication between said gas source and said chamber, valve means in said conduit, control means for operating said valve means to effect communication of said source of gas with said chamber to establish a predetermined gaseous pressure condition in said chamber, means responsive to establishing of said condition in said chamber for operating said valve means to cut off said communication, and mechanism for effecting first a movement of one of said elements relatively toward the other of said elements limited to leave a space between a supported container and a chucked container end and then a further relative movement of said one of said elements to bring said container and said container end into position ready for sealing, said mechanism including means responsive to operation of said control means for automatically effecting said further movement of said other of said elements.

20. In a container sealing machine, a sealing chamber, a container supporting element in said chamber, sealing means including a container end chuck element in said chamber, means for establishing a predetermined gaseous condition within said sealing chamber, power operated mechanism for effecting first a movement of one of said elements relatively towards the other of said elements limited to leave a space between a supported container and a chucked container end and then a further relative movement of said one of said elements to bring said container and said container end into position ready for sealing, said mechanism including a motor, a yieldable driving connection between said motor and said one of said elements, and means responsive to operation of the means which establishes said gaseous condition for automatically effecting said further movement of said other of said elements, means for forming a seal between the container and the container end, means for driving said seal-forming means, connections including a normally disengaged clutch interposed between said driving means and said seal forming means, means for engaging the clutch, a stop normally positioned to prevent operation of said clutch engaging means, and means connecting the movable one of said elements to said stop for shifting said stop to ineffective position in response to positioning of said elements which places the container and container end in position ready for sealing.

21. In a container sealing machine, a sealing chamber, a closure for said chamber, hinge means mounting said closure to swing to open and closed positions respectively and including a hinge pin to which the closure is secured and which turns with swinging of the closure, a container supporting element in said chamber, sealing means including a container end chuck element in said chamber, a pressure responsive piston operatively connected to one of said elements, a cylinder in which said piston is mounted, a source of pressure, and a valve controlling communication of said source of pressure with said cylinder and including a valve rotor operatively connected to said hinge pin and being rotatable therewith for opening the valve when the closure is swung to closed position.

RALPH M. MERO.

REFERENCES CITED

The following references are of record in the file of this patent:

UNITED STATES PATENTS

| Number | Name | Date |
|---|---|---|
| 1,893,716 | Ronzone | Jan. 10, 1933 |
| 2,183,903 | Ardron | Dec. 19, 1939 |
| 2,113,591 | Jacobs | Apr. 12, 1938 |
| 2,033,951 | Nordquist | Mar. 17, 1936 |
| 2,094,753 | Ryon et al. | Oct. 5, 1937 |
| 2,254,819 | Cameron | Sept. 2, 1941 |
| 2,122,087 | Chorlton | June 28, 1938 |
| 856,688 | Farquhar | June 11, 1907 |
| 2,255,707 | Kronquest | Sept. 9, 1941 |
| 2,327,430 | Jackson | Aug. 24, 1943 |
| 1,160,055 | Dorland | Nov. 9, 1915 |
| 1,469,334 | Ross | Oct. 2, 1923 |
| 701,021 | Doyle | May 27, 1902 |
| 831,527 | Landsberger | Sept. 18, 1906 |
| 1,639,945 | Huntar | Aug. 23, 1927 |
| 1,134,065 | Hull | Mar. 30, 1915 |
| 2,092,860 | Stewart et al. | Sept. 14, 1937 |
| 2,114,484 | Chorlton | Apr. 19, 1938 |